United States Patent [19]
Pollozec

[11] 3,865,808
[45] Feb. 11, 1975

[54] RECOVERY OF NITROCELLULOSE FROM THE FILTRATE OBTAINED AFTER THE NITRATION OF CELLULOSE

[75] Inventor: Francois Ange Pollozec, Bergerac, France

[73] Assignee: Societe Nationale des Poudres et Explosifs, Paris, France

[22] Filed: July 9, 1973

[21] Appl. No.: 377,737

[30] Foreign Application Priority Data
July 18, 1972    France .............................. 72.25862

[52] U.S. Cl. .................. 260/223, 210/402, 260/220
[51] Int. Cl. ......................... C08b 5/00, C08b 21/02
[58] Field of Search ............................ 260/220, 223

[56] References Cited
UNITED STATES PATENTS

| | | | |
|---|---|---|---|
| 2,124,894 | 7/1938 | Pool et al............................. | 260/223 |
| 2,288,799 | 7/1942 | Fordyce et al...................... | 260/223 |
| 2,403,493 | 7/1946 | Bouchard et al. .................. | 260/220 |
| 3,200,092 | 8/1965 | Bergman............................. | 260/223 |
| 3,422,169 | 1/1969 | Brooks et al....................... | 260/220 |
| 3,714,143 | 1/1973 | Lewis................................... | 260/220 |

FOREIGN PATENTS OR APPLICATIONS

| | | | |
|---|---|---|---|
| 563,547 | 9/1958 | Canada............................... | 260/220 |

*Primary Examiner*—Ronald W. Griffin
*Attorney, Agent, or Firm*—Bucknam and Archer

[57] ABSTRACT

A process for the recovery of nitrocellulose from the filtrate obtained by filtering nitrocellulose from the aqueous reaction medium in which it has been formed by the nitration of cellulose, which process comprises flocculating nitrocellulose in the filtrate by the addition of a cationic polyacrylamide as flocculant and then filtering off the flocculated nitrocellulose on a filter having a pre-coated filter layer.

The process enables the yield of nitrocellulose manufacture to be increased.

5 Claims, 1 Drawing Figure

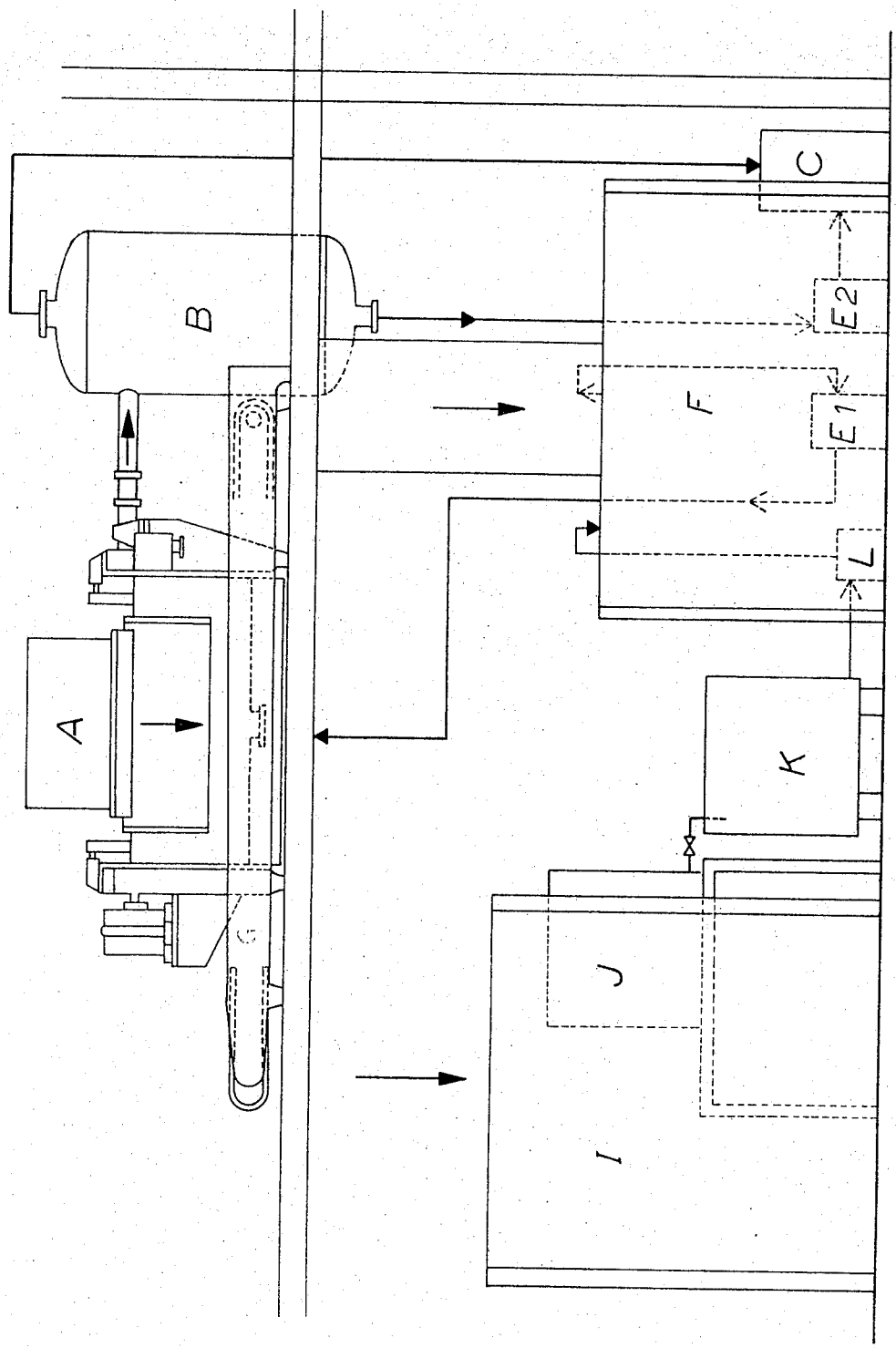

RECOVERY OF NITROCELLULOSE FROM THE FILTRATE OBTAINED AFTER THE NITRATION OF CELLULOSE

The present invention relates to a process for recovering the nitrocellulose present in the filtrate obtained from the filtration carried out after nitration of cellulose during the manufacture of nitrocellulose, and to apparatus for carrying out this process.

The preparation of nitrocellulose by the nitration of cellulose is always carried out in an aqueous medium and the conventional stages of nitration and stabilisation are followed by a filtration stage intended to remove the majority of the water.

At the beginning of the filtration stage, the concentration of nitrocellulose in the reaction mixture is frequently 85 to 90 g/l, whilst the filtrate obtained normally contains 0.5 to 4 g/l of nitrocellulose depending on the extent to which the cellulosic fibre has been refined. This nitrocellulose is present in the filtrate in the form of a colloidal suspension of very fine particles carrying a negative electric charge. The electrostatic forces of repulsion between these particles are greater than the force of gravity and as a result of this the particles remain separate and sedimentation is very slow or even zero. It is therefore necessary either to run the filtrate to waste or to treat it in order to separate the nitrocellulose which is present.

The secondary filtration of the filtrate to remove these fine particles necessitates the use of a very fine porous material and the candle filters used hitherto become clogged very rapidly.

We have now developed an improved method of recovering nitrocellulose from such filtrates.

According to the present invention, there is provided a process for the recovery of nitrocellulose from an aqueous reaction medium in which it has been formed by the nitration of cellulose, the filtrate containing from 0.5 to 4 g/litre of nitrocellulose, which process comprises flocculating nitrocellulose in the filtrate by treating the latter with a cationic polyacrylamide as flocculant and filtering the flocculated nitrocellulose on a filter having a filter layer which is pre-coated with flocculated nitrocellulose.

The nitrocellulose is recovered by scraping off the filter layer and can be incorporated directly into batches of nitrocellulose of the same type, since the flocculating agent used does not affect the stability of the final product.

Amongst the various polyacrylamides which can be used, the polyacrylamide which has given the best results in the process according to the invention, that is to say which make it possible to obtain a good floc and effective clarification in an acceptably short contact time, is that prepared by polymerisation of a mixture of N,N'-methylenebisacrylamide and acrylamide in the presence of N,N,N',N'-tetramethylethylenediamine.

In a particularly preferred method of making the polyacrylamide, the following proportions of reagents are used:

| Acrylamide solution A | | |
|---|---|---|
| N,N-methylenebisacrylamide | 0.8 | g |
| acrylamide | 30 | g |
| water q.s.p. | 100 | ml |
| Catalyst solution B | | |
| N,N,N',N'-tetramethylethylenediamine | 1 | ml |
| riboflavin | 14 | mg |
| water q.s.p. | 100 | ml |

These solutions are reacted in the proportion of:

| Acrylamide solution A | 3 | ml |
|---|---|---|
| Catalyst solution B | 0.8 | ml | optionally in the presence of ampholytic aminoacids.

The product obtained has the appearance of a white powder. It is convenient to use this product in the form of an 0.1 percent by weight solution in water, the amount of the product used preferably being from 3 to 5 g/m$^3$ of filtrate to be treated. A similar product is sold commercially under the trade name Magnafloc 292 by Allied Colloids.

Since the lower concentration limit of nitrocellulose in the filtrate to be treated at which flocculation takes place well is 2 g/l, it is preferred to carry out the flocculation step with an increased proportion of nitrocellulose in the filtrate. It is preferred to have a nitrocellulose content of from 15 to 20 g/litre in the filtrate. This involves prior enriching of the filtrate with nitrocellulose, and this is preferably effected by recycling a part of the product scraped off the filter layer to the filtrate.

A relatively high temperature (20°– 25°C) assists flocculation, whilst at 0°C flocculation is less easy because the molecular movement is less.

Once flocculation has been effected with gentle stirring, it is necessary to avoid "breaking up" the floc by dispersing it when supplying it to the filter.

In order that the invention may be more fully understood, a preferred apparatus for carrying out the process, and the operation thereof, will now be described, by way of example, with reference to the single FIGURE of the accompanying drawing which is a diagrammatic elevation of the apparatus.

The apparatus comprises a rotary vacuum filter A having a pre-coated layer, of the Philippe type, for the filtrate to be treated, in which the vacuum is produced by a liquid ring pump C, the separation of the air and the filtrate being carried out in a tank B. The apparatus further comprises a recycling tank F which has a capacity of 5 m$^3$ and is provided with a horizontal band agitator and into which the following substances are introduced:

a. nitrocellulose coming from a mixer and intended to form the pre-coated layer on the drum of the filter which is equipped with a special filtration screen. The nitrocellulose is mixed with the flocculating reagent, this point being essential in order to make the pre-coated layer effective, and b. the filtrate to be treated, the necessary flocculating agent and the nitrocellulose which is recycled from the pre-coated layer and is intended to keep the concentration of the contents of the recycling tank F above a minimum threshold value. Operation (a) is carried out before operation (b), which is in fact the way in which the apparatus normally works.

A pump E1 is arranged to supply the trough of the filter A with filtrate to be treated enriched with nitrocellulose. A horizontal endless belt G is positioned below the filter A and receives the product obtained by scraping the pre-coated layer of the filter. The belt G can be driven in both directions: in one direction, it supplies the recycling tank F in order to maintain the concentration of nitrocellulose in the mixture to be filtered, and in the other direction, it supplies a holding tank I in which the nitrocellulose recovered from the filtrate is collected. The collected nitrocellulose is then conveyed to a mixer in which it is mixed with the same type of nitrocellulose.

The filtrate from the filter A is taken from the base of the tank B via a barometric column by means of an extraction pump E2 which supplies the liquid ring of the vacuum pump C.

The apparatus also comprises a station for preparing and measuring the solution of flocculating agent, which station comprises a tank J in which the flocculating agent in powder form is introduced and dispersed and which supplies the solution obtained to a tank K which is a reservoir for the flocculating agent to be used in the process and from which the flocculating agent solution is passed by a metering pump L to the recycling tank F.

In operation of this apparatus, the filtrate, which is stored in a concrete collection tank (not shown) is conveyed by pumps having an output of 25 m³/hour to the recycling tank F, while operating the agitator therein and the following products are introduced simultaneously: a metered amount of the flocculating agent solution, and an amount of nitrocellulose supplied from the filter. The pump E1, which has an output of 25 m³/hour, supplies the trough of the vacuum filter with the mixture of filtrate and flocculating agent formed in the tank F; the pump E1 is such as not to break up the floc formed.

The pre-formed layer of flocculated nitrocellulose on the filter A has a surface area of 8 m² and the flow rate of the filtrate through it is about 3 m/hour.

The filter cake formed on the pre-coated layer is scraped by an adjustable scraper and the scraped off solid material falls on to the belt G, the direction of movement of which is reversed according to a predetermined programme. In one direction of movement, the belt supplies the recycling tank F in such a way as to maintain a minimum concentration of nitrocellulose in the filtrate/flocculant mixture, and in the other direction of movement, the belt supplies the holding tank I in which the nitrocellulose recovered from the filtrate is stored.

What is claimed is:

1. A process for the recovery of nitrocellulose from the filtrate obtained by filtering nitrocellulose from an aqueous reaction medium in which it has been formed by the nitration of cellulose, said filtrate containing from 0.5 to 4 g/litre of nitrocellulose, which process comprises the steps of:
   i. flocculating nitrocellulose in said filtrate by treating the latter with a cationic polyacrylamide as flocculant, and
   ii. filtering said flocculated nitrocellulose from the treated filtrate on a filter having a filter layer which is pre-coated with flocculated nitrocellulose of thickness sufficient to allow a flow of about 3 m/h.

2. A process as set forth in claim 1, wherein the amount of polyacrylamide flocculant introduced into said filtrate is from about 3 to about 5 mg/litre.

3. A process as set forth in claim 1, wherein the polyacrylamide is obtained by the polymerisation of N,N-methylenebisacrylamide and acrylamide in the presence of N,N,N',N'-tetramethylethylenediamine.

4. A process as set forth in claim 1, wherein the proportion of nitrocellulose in said filtrate is initially less than 2 g/litre and is increased to greater than about 2 g/litre by the addition of nitrocellulose which is scraped off the filter layer and recycled to said filtrate.

5. A process as set forth in claim 4, wherein the proportion of nitrocellulose in said filtrate is brought to from about 15 to about 20 g/litre.

* * * * *